(12) United States Patent
Schonewille

(10) Patent No.: US 6,763,304 B2
(45) Date of Patent: Jul. 13, 2004

(54) METHOD FOR PROCESSING SEISMIC DATA TO ATTENUATE MULTIPLES

(75) Inventor: Michel Albert Schonewille, Guildford (GB)

(73) Assignee: PGS Americas, Inc., Houston, TX (US)

( * ) Notice: Subject to any disclaimer, the term of this patent is extended or adjusted under 35 U.S.C. 154(b) by 0 days.

(21) Appl. No.: 10/152,162

(22) Filed: May 21, 2002

(65) Prior Publication Data

US 2003/0220744 A1 Nov. 27, 2003

(51) Int. Cl.$^7$ ................................................. G01V 1/00
(52) U.S. Cl. ........................................... 702/14; 703/5
(58) Field of Search ........................... 702/14, 12, 17, 702/16; 703/5; 367/45, 63, 73, 38, 53

(56) References Cited

U.S. PATENT DOCUMENTS

| | | | | |
|---|---|---|---|---|
| 4,760,563 A | * | 7/1988 | Beylkin | 367/73 |
| 5,572,483 A | | 11/1996 | Chambers et al. | 367/45 |
| 5,719,822 A | | 2/1998 | Wang | 367/53 |
| 5,852,588 A | | 12/1998 | de Hoop et al. | 367/38 |
| 5,873,050 A | * | 2/1999 | Schneider et al. | 702/14 |
| 5,909,655 A | | 6/1999 | Canadas et al. | 702/17 |
| 5,920,828 A | * | 7/1999 | Norris et al. | 702/14 |
| 5,940,778 A | * | 8/1999 | Marfurt et al. | 702/16 |
| 5,970,023 A | * | 10/1999 | Chambers et al. | 367/63 |
| 6,018,500 A | | 1/2000 | Chambers | 367/73 |
| 6,094,620 A | | 7/2000 | Gasparotto et al. | 702/14 |
| 6,196,350 B1 | | 3/2001 | Minto | 181/106 |
| 6,269,310 B1 | | 7/2001 | Washbourne | 702/17 |
| 6,324,477 B1 | | 11/2001 | Bork | 702/17 |
| 6,446,008 B1 | * | 9/2002 | Ozbek | 702/17 |

FOREIGN PATENT DOCUMENTS

| FR | WO 00/67045 | * 11/2000 | |
|---|---|---|---|
| GB | 2346975 | 8/2000 | G01V/1/00 |
| WO | WO 00/067045 | 11/2000 | G01V/1/00 |

OTHER PUBLICATIONS

Hampson, D., "Inverse velocity stacking for multiple elimination", Journal Can. Soc. of Expl. Geophys., 1986, 44–55, vol. 22, No. 1, 4 pages.

Sacchi, M..D. and Ulrych, T.J., "High–resolution velocity gathers and offset space reconstruction", Geophysics, 1995, 1169–1177, vol. 60, No. 4, 8 pages.

Hunt, L., Cary, P., and Upham, W, "The impact of an improved Radon transform on multiple attenuation", 66$^{th}$ Ann. Internat. Mtg.: Soc. of Expl. Geophys., 1996, 1535–1538, vol. II, 3 pages.

Zwartjes, P. and Duijndam, A., "Optimizing reconstruction for sparse spatial sampling", 70$^{th}$ Ann. Internat. Mtg.: Soc. of Expl. Geophys., 2000, 2162–2165, vol. II, 3 pages.

Sacchi, M.D. and Porsani, M., "Fast high–resolution parabolic Radon transform", 69$^{th}$ Ann. Internat. Mtg.: Soc. of Expl. Geophys., 1999, 1477–1480, vol. II, 3 pages.

Hargreaves, N. and Cooper, N., "High–Resolution Radon Demultiple", SEG/San Antonio Expanded Abstracts, 2001, 3 P.

Hargreaves, N., Cooper, N., Whiting, P., "High–Resolution Radon Demultiple", ASEG 15$^{th}$ Geophysical Conference and Exhibition, 2001, 4 P.

(List continued on next page.)

Primary Examiner—John Barow
Assistant Examiner—Victor J. Taylor
(74) Attorney, Agent, or Firm—Eugene Thigpen; Charles R. Schweppe

(57) ABSTRACT

A seismic data set is processed by selecting a set of gathers in the seismic data set. A frequency independent constraint matrix is calculated in a first gather. A model solution in at least one second gather is calculated by using the constraint matrix in a high-resolution Radon transform.

20 Claims, 10 Drawing Sheets

OTHER PUBLICATIONS

Duijndam, A.J.W., Schonewille, M., Romijn, R., Koek, E.A., and Ongkieong L., "A General Reconstruction Scheme for Dominant Azimuth 3–D Seismic Data", 69$^{th}$ Ann. Internat. Mtg.: Soc. of Expl. Geophys., 1999, 1441–1444, 3 pages.

Cary, P.W., "The simplest discrete Radon transform", 68$^{th}$ Ann. Internat. Mtg.: Soc. of Expl. Geophys., 1998, 1999–2002, 3 pages.

Hugonnet, P., Herrmann, P., and Ribeiro, C., "High Resolution Radon: A review", EAGE 63$^{rd}$ Conference & Technical Exhibition, 2001, Session: IM–2, ?.

Trad, D.O., Ulrych, T.J., and Sacchi, M.D, "Accurate interpolation with high–resolution time–variant Radon transforms", Geophysics, 2002, 644–656, vol. 67, No. 2, 2 pages.

* cited by examiner

METHOD FOR PROCESSING SEISMIC DATA TO ATTENUATE MULTIPLES

BACKGROUND OF THE INVENTION

1. Field of the Invention

This invention relates generally to the field of geophysical prospecting. More particularly, the invention relates to the field of seismic data processing. Specifically, the invention is a method for attenuating multiples in seismic data using a high-resolution Radon transform.

2. Description of the Related Art

In the field of geophysical prospecting, the knowledge of the subsurface structure of the earth is useful for finding and extracting valuable mineral resources, such as oil and natural gas. A well-known tool of geophysical prospecting is a seismic survey. A seismic survey transmits acoustic waves emitted from appropriate energy sources into the earth and collects the reflected signals using an array of receivers. Then seismic data processing techniques are applied to the collected data to estimate the subsurface structure.

In a seismic survey, the seismic signal is generated by injecting an acoustic signal from on or near the earth's surface, which then travels downwardly into the earth's subsurface. The acoustic signal may also travel downwardly through a body of water, in a marine survey. Appropriate energy sources may include explosives or vibrators on land and air guns or marine vibrators in water regimes. When the acoustic signal encounters a seismic reflector, an interface between two subsurface strata having different acoustic impedances, a portion of the acoustic signal is reflected back to the surface, where the reflected energy is detected by a receiver. Appropriate detectors may include particle motion detectors (such as geophones) on land and pressure detectors (such as hydrophones) in water regimes. Both sources and receivers may be deployed by themselves or, more commonly, in arrays.

The seismic energy recorded by each source and receiver pair during the data acquisition stage is known as a seismic trace. Seismic data traces contain the desired seismic reflections, known as the primary reflections or primaries. A primary reflection comes from the detection of an acoustic signal that travels from a source to a receiver with but a single reflection from a subsurface seismic reflector. Unfortunately, the seismic traces often contain many unwanted additional reflections known as multiple reflections or multiples, which can obscure and even overwhelm the sought-after primary reflections. A multiple reflection comes from the recording of an acoustic signal that has reflected more than once before being detected by a receiver. The additional multiple reflections could come from subsurface reflectors or from the surface of the earth in a land seismic survey and the water-earth or air-water interfaces in a water seismic survey. The recorded signals from multiples obscure the recorded signals from the primaries, making it harder to identify and interpret the desired primaries. Thus, the removal, or at least attenuation, of multiples is a desired step in seismic data processing in many environments. This is particularly so in marine seismic surveys, where multiples are especially strong relative to primaries. This is because the water-earth and, particularly, the air-water interfaces are strong seismic reflectors due to their high acoustic impedance contrasts.

One of many techniques well known in the art of seismic data processing for attenuating multiples is the use of a Radon transform. First, a single Fourier transform takes data from the space-time domain, or (x, t) domain, to the Fourier domain, or (x, ω) domain. Here, co is the frequency. Then, for each frequency c, the Radon transform, or decomposition, transforms data to the Radon domain, or (q, τ) domain. Here, q is a parameter associated with the curvature of the curvilinear trajectory describing the seismic event in the (x, t) domain and X (tau) is the zero offset intercept time. The Radon transform is given in simplest terms by the equation $$Lm = d, \quad (1)$$

where L is a matrix representing the Radon transform, m is a vector representing the model being solved for in the Radon domain, and d is a vector containing the seismic data set being processed. The vector d is size M, where M is the number of available seismic traces $d_i$ in the seismic data set d. Typically, M is the number of digitized seismic traces in a gather. The vector m is size N, where N is the number of spectral curvature components $m_i$ that d is being decomposed into by the Radon transform L. Thus, the matrix L representing the Radon transform is size M×N and decomposes the seismic data samples $d_i$ in d into the spectral components $m_i$ in m.

In general, problems like Equation (1) can be solved by a least squares approach, such as $$m = (L^H L)^{-1} L^H d. \quad (2)$$

However, the matrix $L^H L$ may not be invertible for the Radon transform matrix L. Thus, Equation (1) is typically solved as a diagonally stabilized least squares problem given by $$m = (L^H L + kI)^{-1} L^H d. \quad (3)$$

Here k is a pre-whitening factor or diagonal stabilization constant and I is the N×N identity matrix. The diagonal stabilization matrix kI is added to the matrix $L^H L$ to avoid numerical instabilities in the matrix inversion. The superscript H indicates the Hermitian transpose of a matrix. The matrix $(L^H L + kI)$ to be inverted has Toeplitz structure and thus the inversion can be done using Levinson recursion.

Once the data has been transformed into the Radon domain as the model solution m, the primaries can be muted from m. Then, the multiples remaining in m can be transformed back into the spatial domain by the inverse transform $$d_m = L m_m, \quad (4)$$

where $d_m$ is the data vector containing substantially just multiples and $m_m$ is the model containing substantially just multiples. Now the multiples in multiple data vector $d_m$ can be subtracted from the data vector d to give substantially just the desired primaries. The matrix to be inverted, $(L^H L + kI)$, has Toeplitz structure and can be inverted using the Levinson recursion scheme, since the stabilization matrix kI is constant.

Hampson, D., 1986, "Inverse Velocity Stacking for Multiple Elimination", J. Can. Soc. of Expl. Geophys., 22(1): 44–55, describes a parabolic Radon transform. It is used to attenuate multiples in a computer-efficient way. This is the method described above. However, it only works well with large move outs. These large move outs are, for example, twenty or more milliseconds at the farthest usable offset.

Sacchi, M. D. and Ulrych, T. J., 1995, "High-Resolution Velocity Gathers and Offset Space Reconstruction", Geophysics, 60, 4, 1169–1177, describe a high-resolution Radon transform for attenuating multiples. The high-resolution transform constrains the Radon spectra to be sparse, using a sparseness prior for the curvature direction. This could also be called a re-weighted iterative approach. However, the high-resolution transform can show extra artifacts, which may compromise amplitude preservation. In addition, amplitudes may be affected if the induced sparseness is too strong.

Hunt, L., Cary, P., and Upham, W., 1996, "The Impact of an Improved Radon Transform on Multiple Attenuation", 66th Ann. Internat. Mtg.: Soc. of Expl. Geophys., 1535–1538, shows that a high-resolution parabolic Radon transform based on Sacchi and Ulrych's 1995 publication improves the separation of primaries from multiples that have a small move-out difference. However, the techniques still suffers from the same deficits as Sacchi and Ulrych does.

Zwartjes, P. and Duijndam, A., 2000, "Optimizing Reconstruction for Sparse Spatial Sampling, 70th Ann. Internat. Mtg.: Soc. of Expl. Geophys., 2162–2165, show that high-resolution Fourier regularization shows a better reconstruction in large gaps than standard least squares regularization.

In a high-resolution Radon transform, the diagonal matrix kI in the diagonally stabilized least squares approach given by Equation (3) is replaced by a N×N diagonal matrix Q. The matrix Q is a stabilization matrix. Thus, Equation (3) is replaced by $$m = (L^H L + Q)^{-1} L^H d. \quad (5)$$

The matrix Q in a high-resolution Radon transform is more than just a stabilization matrix. The matrix Q is now also used to constrain the solution m to the dominant curvatures q in the Radon spectral domain. Thus, the matrix Q will now be referred to more generally as a constraint matrix, rather than just a stabilization matrix.

Crucially, the constraint matrix Q is dependent upon the solution for the Radon domain m, and, conversely, that solution m is dependent upon Q. Thus, Equation (5) is a nonlinear problem and hence difficult, that is, expensive, to solve. Making the Radon transform approach to attenuating multiples more useful requires finding more computationally efficient methods for calculating or estimating the constraint matrix Q.

Sacchi and Porsani, 1999, "Fast high-resolution parabolic Radon transform", 69th Ann. Internat. Mtg.: Soc. of Expl. Geophys., 1477–1480, propose to solve this problem, such as given in Equation (10), as an iterative linear problem. The constraint matrix Q is iteratively derived using the solution for m from the previous step. FIG. 1 shows a flowchart illustrating the processing steps of the method of Sacchi and Porsani (1999) for processing seismic data.

At step 101, a seismic data set d is selected for seismic data processing. The seismic data set d is typically a gather of recorded seismic traces.

At step 102, the seismic data set d selected in step 101 is transformed from the (x, t) domain to the (x, $\omega$) domain. This transformation generates a transformed data set $d_F$. The transformation defines a set of frequencies $\omega$ in $d_F$. The transformation is typically done by a Fourier transform, preferably by a fast Fourier transform.

At step 103, a set of Radon spectral components are selected for a Radon transform. The spectral components are a set of curvatures q.

At step 104, a frequency co is selected from the set of frequencies obtained in the transformed data set $d_F$ in step 102. The frequencies would typically be selected in sequential order, starting at the lowest frequency.

At step 105, a matrix L representing a Radon transform into the set of curvatures q selected in step 103 is constructed. The matrix L satisfies Equation (1) for a Radon model solution m as defined in that discussion. Thus, the solution m is defined as a function of the curvatures q at each frequency $\omega$. At each frequency $\omega$, the solution m will be solved as an iterative series of linear problems giving $m_n$, for n=0, 1, . . . , for however many iterations are required to arrive at a satisfactory solution.

At step 106, an initial Radon model solution mo is calculated for the frequency a) by the following straightforward approach, $$m_0 = L^H d. \quad (6)$$

At step 107, a constraint matrix $Q_{i-1}$ for the Radon transform matrix L is derived from the Radon model solution $m_{i-1}$ calculated at the previous iteration in either step 106 or 108. The matrix $Q_{i-1}$ is defined as is the matrix Q in Equation (5), above.

At step 108, another iterative Radon model solution $m_i$ is calculated at the frequency $\omega$, using the value for the constraint matrix $Q_{i-1}$ derived in step 107, by the following version of Equation (5), $$m_i = (L^H L + Q_{i-1})^{-1} L^H d. \quad (7)$$

At step 109, it is determined if another iteration is required for another iterative solution $m_i$ to obtain a satisfactory solution for m. Any suitable criteria may be used to determine if the current value of $m_i$ is satisfactory. If the answer is no, then the process returns to step 106 to begin another iteration. If the answer is yes, then the process continues to step 110.

At step 110, it is determined if all the frequencies co desired have been selected. If the answer is no, then the process returns to step 104 to select another frequency. If the answer is yes, then the process continues to step 111.

At step 111, the data is transformed from the (q, $\omega$) domain to the (q, tau) domain. Here tau is the zero offset intercept time. The transformation is preferably done by an inverse fast Fourier transform.

The method of Sacchi and Porsani's 1999 publication uses an iterative linear scheme at each frequency to derive the constraint matrix Q from the solution of the model m from the previous iteration, but at the same frequency.

The international application, No. PCT/IB00/00659, published as International Publication Number WO 00/67045, "A High resolution Radon Transform Seismic Traces Processing", by Compagnie Generale de Geophysique, proposes a non-iterative approach. They propose to derive the constraint matrix Q from the solution m at the previous frequency. They describe a constrained high-resolution parabolic Radon transform method. The method involves performing a constrained high-resolution Radon decomposition at various frequencies in seismic traces, wherein the Radon decomposition at a given frequency is constrained as a function of the Radon decomposition at at least a lower frequency. In particular, it describes successively performing a Radon decomposition at various sparse frequencies, wherein the Radon decomposition at a given frequency is constrained as a function of the Radon decomposition at the previous frequency. This has the computational advantage of avoiding the re-weighted iterative approach of Sacchi and Ulrych (1995) or Sacchi and Porsani (1999). However, the constraint matrix Q used in this Radon transform is still frequency dependent. FIG. 2 shows a flowchart illustrating the processing steps of a method of the Compagnie Generale de Geophysique patent application publication for processing seismic data.

At step 201, a seismic data set d is selected for seismic data processing. The seismic data set d is typically a gather of recorded seismic traces.

At step 202, the seismic data set d selected in step 201 is transformed from the (x, t) domain to the (x, ω) domain. This transformation defines a set of frequencies ω. The transformation is preferably done by a fast Fourier transform.

At step 203, a set of Radon spectral components are selected for a Radon transform. The spectral components are a set of curvatures $q_i$ for i=−1, 0, 1, ..., N.

At step 204, a frequency Co is selected from the frequencies obtained in the seismic data set d from its transformation in step 102. The frequencies would typically be selected in sequential order, starting at the lowest frequency.

At step 205, a matrix L representing a Radon transform into the set of curvatures $q_i$ selected in step 203 is constructed. The matrix L satisfies Equation (1) for a Radon model solution m as defined in that discussion. Thus, the solution m is defined as a function of the curvatures $q_i$ for each frequency $\omega_i$. At each frequency $\omega_i$, the solution $m(\omega_i)$ will be solved as a linear problem.

At step 206, an initial Radon model solution $m(\omega_{-1})$ should be calculated for the frequency $\omega_{-1}$. However, the Compagnie Generale de Geophysique patent application publication does not mention how they would do this. Therefore, it can only be assumed that an initial solution $m(\omega_{-1})$ is somehow obtained. One simple, straightforward approach would be the following equation, $$m(\omega_{-1}) = L^H d(\omega_0). \tag{8}$$

At step 207, a frequency $\omega_i$ is selected from the set of frequencies selected in step 204. The frequencies are chosen in sequential order, starting at the lowest.

At step 208, a constraint matrix $Q_{i-1}$ for the Radon transform matrix R is derived from the Radon model solution $m(\omega_{i-1})$ calculated at the previous frequency $\omega_{i-1}$ in either step 206 or 209. The matrix $Q_{i-1}$ is defined as is the matrix Q in Equation (5), above.

At step 209, a Radon model solution $m(\omega)$ is calculated at the frequency $\omega_i$, using the value for the diagonal constraint matrix $Q_{i-1}$ derived at the previous frequency $\omega_{i-1}$ in step 208, by the following version of Equation (10), $$m(\omega_i) = (L^H L + Q(\omega_{i-1}))^{-1} L^H d. \tag{9}$$

At step 210, it is determined if all the frequencies have been selected. If the answer is no, then the process returns to step 204 to select the next frequency. If the answer is yes, then the process continues to step 211.

At step 211, the data is transformed from the (q, c) domain to the (q, tau) domain. Here tau is the zero offset intercept time. The transformation is preferably done by an inverse fast Fourier transform.

The method of the Compagnie Generale de Geophysique, described in FIG. 2, is non-iterative and thus more computationally efficient than the method of Sacchi and Porsani (1999), described in FIG. 1. In addition, by using a lower frequency as a constraint or stabilization on the next frequency, this method is better at handling aliased data. However, the matrix Q is frequency dependent. The approximation for Q is calculated for each frequency in the gather.

Hargreaves, N. and Cooper, N., 2001, "High-Resolution Radon Demultiple", 71$^{st}$ Ann. Internat. Mtg.: Soc. of Expl. Geophys., 1325–1328, show that the high-resolution transform can cause smearing of energy in the transform domain in the direction in which no sparseness is imposed, i.e. the time direction. This is seen in their FIG. 2. It was also apparent in FIG. 4a of Sacchi and Ulrych's 1995 publication, discussed above. This smearing raises the question of amplitude preservation. In addition, amplitude preservation may not be optimal if the induced sparseness would be too strong. For example, if a perfectly parabolic event with AVO variation is focused onto a single curvature parameter, then the AVO variation is lost.

Therefore, a need exists in the field of seismic data processing for a high-resolution Radon transform method for attenuating multiples that is potentially more computationally efficient. Thus, a need exists for a method to calculate a constraint matrix that is both non-iterative and frequency independent. Additionally, the method should preserve amplitudes, yet avoid smearing energy in the time direction.

BRIEF SUMMARY OF THE INVENTION

The invention is a method for processing a seismic data set. A seismic data set is processed by selecting a set of gathers in the seismic data set. A frequency independent constraint matrix is calculated in a first gather. A model solution in at least one second gather is calculated by using the constraint matrix in a high-resolution Radon transform.

In an alternative embodiment, the primaries are attenuated in the model solution, generating a multiples model solution. The multiples model solution is inverse transformed from the Radon domain back to the spatial domain, generating a multiples data set. The multiples data set is subtracted from the seismic data set, generating a substantially multiple-free data set of primaries.

BRIEF DESCRIPTION OF THE DRAWINGS

The invention and its advantages may be more easily understood by reference to the following detailed description and the attached drawings, in which:

FIG. 6a shows the corresponding Radon spectra for the FIG. 5a;

Figure 1:
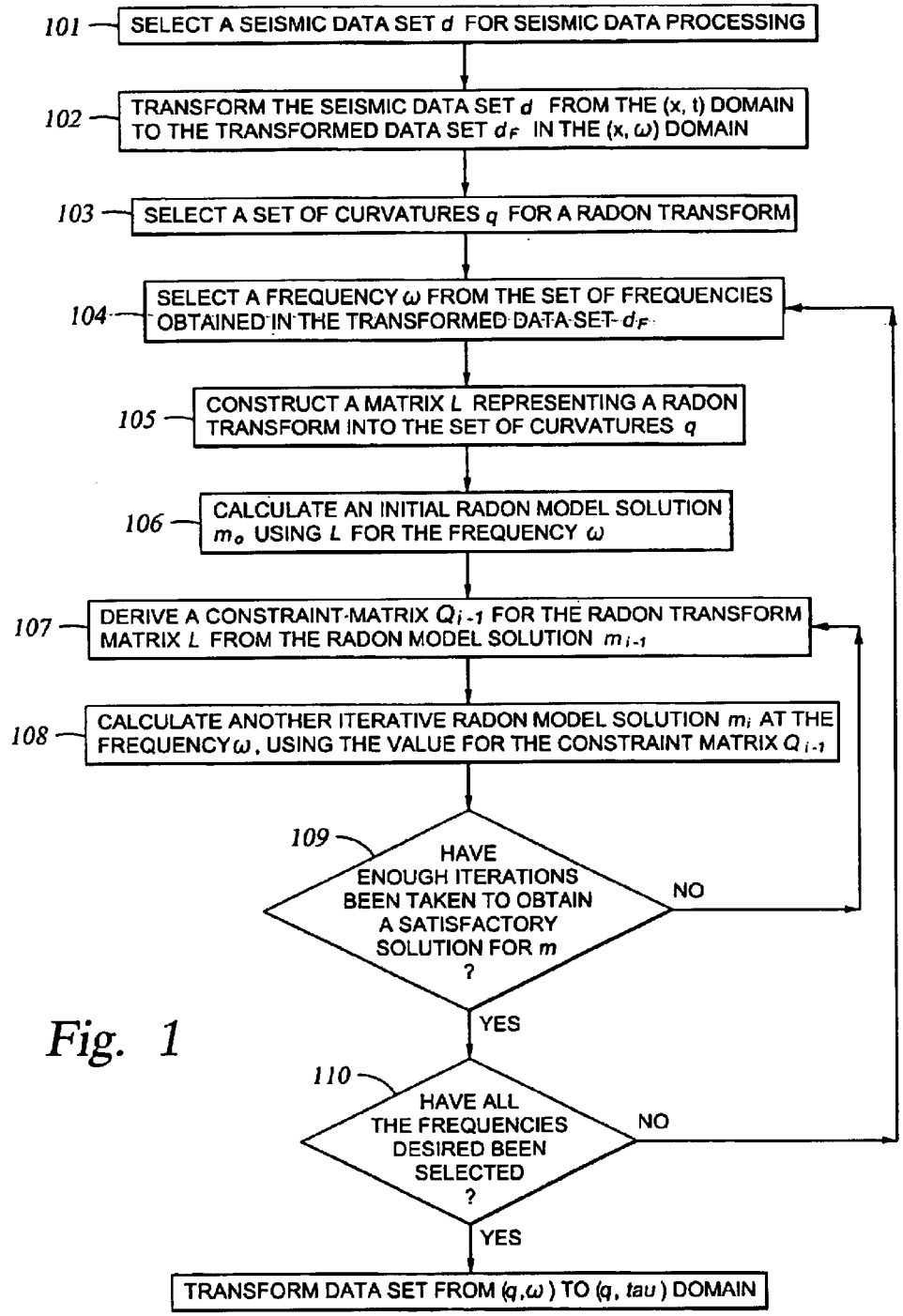
FIG. 1 shows a flowchart illustrating the processing steps of the method of Sacchi and Porsani (1999) for processing seismic data.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a method for processing seismic data. In particular, the invention is a method for attenuating multiples in seismic data using a constrained high-resolution Radon transform with a frequency independent constraint matrix Q. Many of the advantages of the invention arise from the method of computation of the frequency independent constraint matrix Q.

The Radon transform is well known in the art of seismic data processing for attenuating multiples. First, a Fourier transform takes a seismic data set d from the space-time domain, or (x, t) domain, to a Fourier-transformed data set $d_F$ in the Fourier domain, or (x, $\omega$) domain. Here, $\omega$ is the frequency. Then, for each frequency $\omega$, the Radon transform, or decomposition, transforms the Fourier-transformed data set $d_{Ft}$ to a Radon-transformed data set $d_R$ in the Radon domain, or ($\tau$, q) domain. Here, $\tau$ (tau) is the zero offset intercept time and q is a parameter associated with the curvature of the curvilinear trajectory describing the seismic event in the (x, t) domain. The Radon transform is given in simplest terms by the equation $$Lm=d, \tag{10}$$

where L is a matrix representing the Radon transform, m is a vector representing the model being solved for in the Radon domain, and d is a vector containing the seismic data set being processed. The vector d is size M, where M is the number of available seismic traces $d_i$ in the seismic data set d. Typically, M is the number of digitized seismic traces in a gather. The vector m is size N, where N is the number of spectral curvature components $m_i$ that d is being decomposed into by the Radon transform L. Thus, the matrix L representing the Radon transform is size M×N and decomposes the seismic data samples $d_i$ in d into the spectral components $m_i$ in m.

In general, problems like Equation (10) can be solved by a least squares approach, such as $$m=(L^H L)^{-1} L^H d. \tag{11}$$

However, the matrix $L^H L$ may not be invertible for the Radon transform matrix L. Thus, Equation (10) is typically solved as a diagonally stabilized least squares problem given by $$m=(L^H L+kI)^{-1} L^H d. \tag{12}$$

Here k is a pre-whitening factor or diagonal stabilization constant and I is the N×N identity matrix. The diagonal stabilization matrix kI is added to the matrix $L^H L$ to avoid numerical instabilities in the matrix inversion. The superscript H indicates the Hermitian transpose of a matrix. The matrix ($L^H L$+kI) to be inverted has Toeplitz structure and thus the inversion can be done using Levinson recursion.

The high-resolution approaches to a Radon transform differ in using a non-constant diagonal stabilization matrix, which depends upon the data. Then the matrix to be inverted does not have a Toeplitz structure and cannot be inverted by a Levinsion recursion scheme. However, the matrix to be inverted is a sum of a Toeplitz structure matrix and a diagonal matrix and thus can be inverted very efficiently by a conjugate gradient method. Except for the matrix inversion, the other computations (computing $L^H d$, the Toeplitz matrix $L^H L$, etc.) remain the same.

The starting point to defining a high-resolution Radon transform approach is Equation (33) of Sacchi and Ulrych's 1995 publication:

$$m=(L^H C^{-1} L+\lambda P(m)^{-1})^{-1} L^H C^{-1} d, \tag{13}$$

where C is the covariance matrix of the noise. It is usually assumed that there is no correlation between the noise components at different curvatures. This results in a diagonal matrix $$C=\sigma_n^2 I, \tag{14}$$

where $\sigma_n^2$ is the variance. Thus, the expectance of the noise energy is equal for all curvatures.

Using Equation (14), Equation (13) can be rewritten as $$m=(L^H L+\lambda \sigma_n^2 P(m)^{-1})^{-1} L^H d \tag{15}$$

The diagonal elements of the diagonal matrix P(m) can be defined by $$P_{ii}=|m_i|^2+e, \tag{16}$$

where e is a perturbation constant that represents the default energy in the absence of both primaries and multiples. This leads to the definition of another matrix Q by $$\lambda \sigma_n^2 P(m)^{-1} = Q_{ii} = \frac{\lambda \sigma_n^2}{|m_i|^2 + e}. \tag{17}$$

The N×N diagonal matrix Q in Equation (17) corresponds to the diagonal matrix kI in the diagonally stabilized least squares approach given by Equation (3). The matrix Q is a stabilization matrix. Thus, Equation (3) could be replaced by $$m=(L^H L+Q)^{-1} L^H d. \tag{18}$$

The matrix Q in a high-resolution Radon transform is more than just a stabilization matrix. The matrix Q is now also used to constrain the solution m to the dominant curvatures q in the Radon spectral domain. Thus, the matrix Q will now be referred to more generally as a constraint matrix, rather than just a stabilization matrix.

Crucially, the constraint matrix Q is dependent upon the solution for the Radon domain m, and, conversely, that solution m is dependent upon Q. Thus, Equation (18) is a nonlinear problem and hence difficult, that is, expensive, to solve. Making the Radon transform approach to attenuating multiples more useful requires finding more computationally efficient methods for calculating or estimating the constraint matrix Q.

The parameters $\lambda$, $\sigma_n^2$, and e in Equation (17) are constants to be specified by the user. Since $\lambda$ and $\sigma_n^2$ can compensate each other, the number of user parameters can be reduced to two. A better resemblance to the conventional diagonally stabilized least squares approach in Equation (3) can be obtained by using a slightly different formulation of the constraint matrix Q than used in Equation (18).

First, note that for large values of e, Equation (17) reduces to the approximation $$Q_{ii} \approx \frac{\lambda \sigma_n^2}{e} = \text{constant.} \quad (19)$$

This converts Q into a constant diagonal matrix, just as the least squares stabilization matrix kI is. The high-resolution Radon transform of Equation (16) becomes effectively equivalent to the conventional diagonally stabilized least squares Radon transform of Equation (3). By replacing $$\frac{\lambda \sigma_n^2}{e} = k, \quad (20)$$

Equation (17) can be rewritten as $$Q_{ii} = \frac{\lambda \sigma_n^2}{|m_i|^2 + e} = k \frac{1}{1 + \frac{|m_i|^2}{e}}. \quad (21)$$

It is not practical to have a user specify an absolute value for the default energy e. Thus, Equation (21) is changed to $$Q_{ii} = k \frac{1}{1 + \frac{|m_i|^2}{s \max_j (|m_j|^2)}}, \quad (22)$$

where k is a stabilization parameter and s is a sparseness parameter. The stabilization parameter k is similar to the pre-whitening factor or diagonal stabilization constant k in the diagonally stabilized least squares approach to the Radon transform given in Equation (3). The sparseness parameter s specifies the default energy in the absence of both primaries and multiples as a fraction of the maximum energy, $\max_j (|m_j|^2)$, in the Radon domain.

The constraint matrix Q now plays a double role in the calculation of the solution m. It both stabilizes the solution process through the choice of the stabilization parameter k and constrains the solution process through the choice of the sparseness parameter s.

Figure 2:
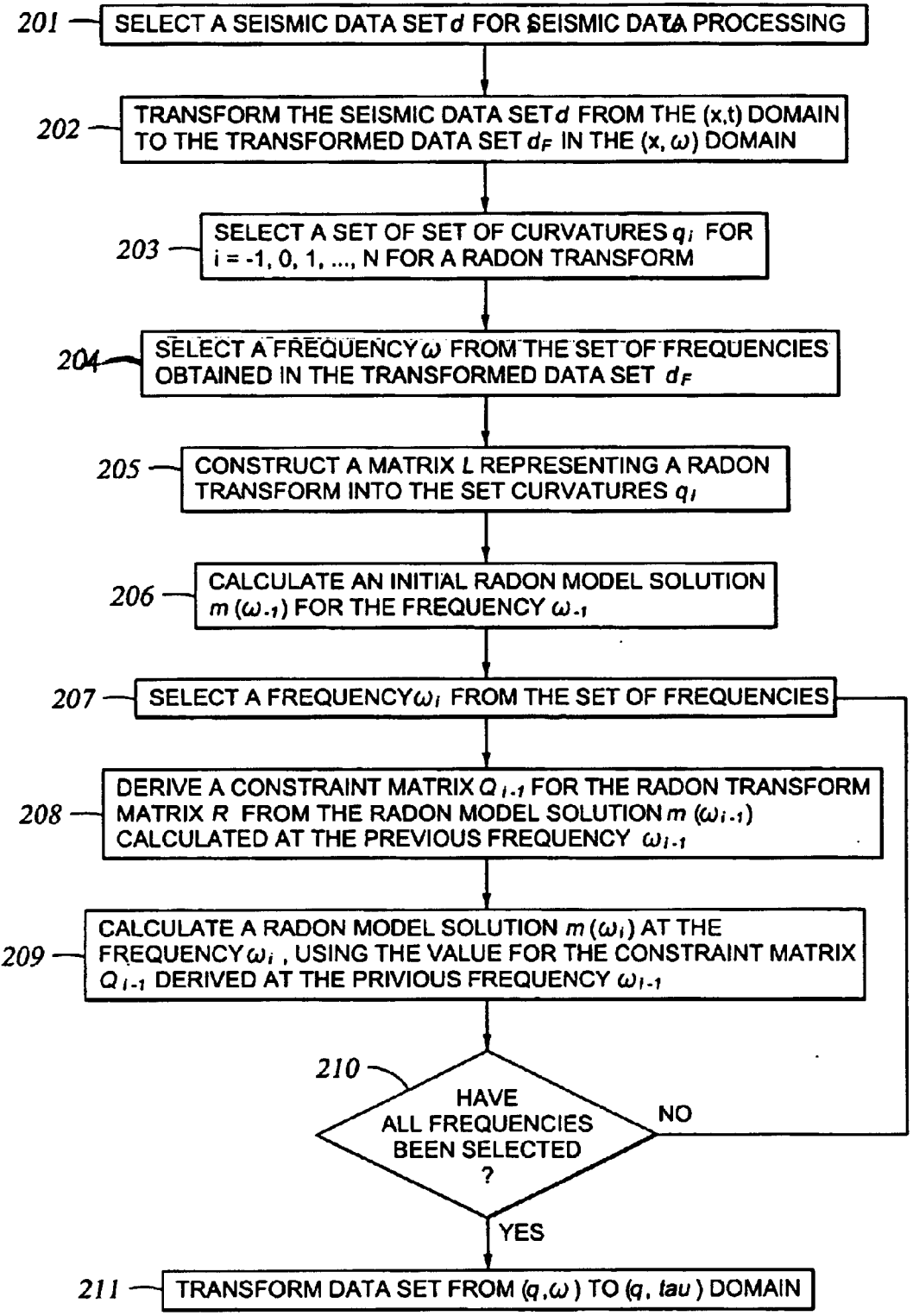
FIG. 2 shows a flowchart illustrating the processing steps of a method of the Compagnie Generale de Geophysique patent application publication for processing seismic data.
Figure 3A:
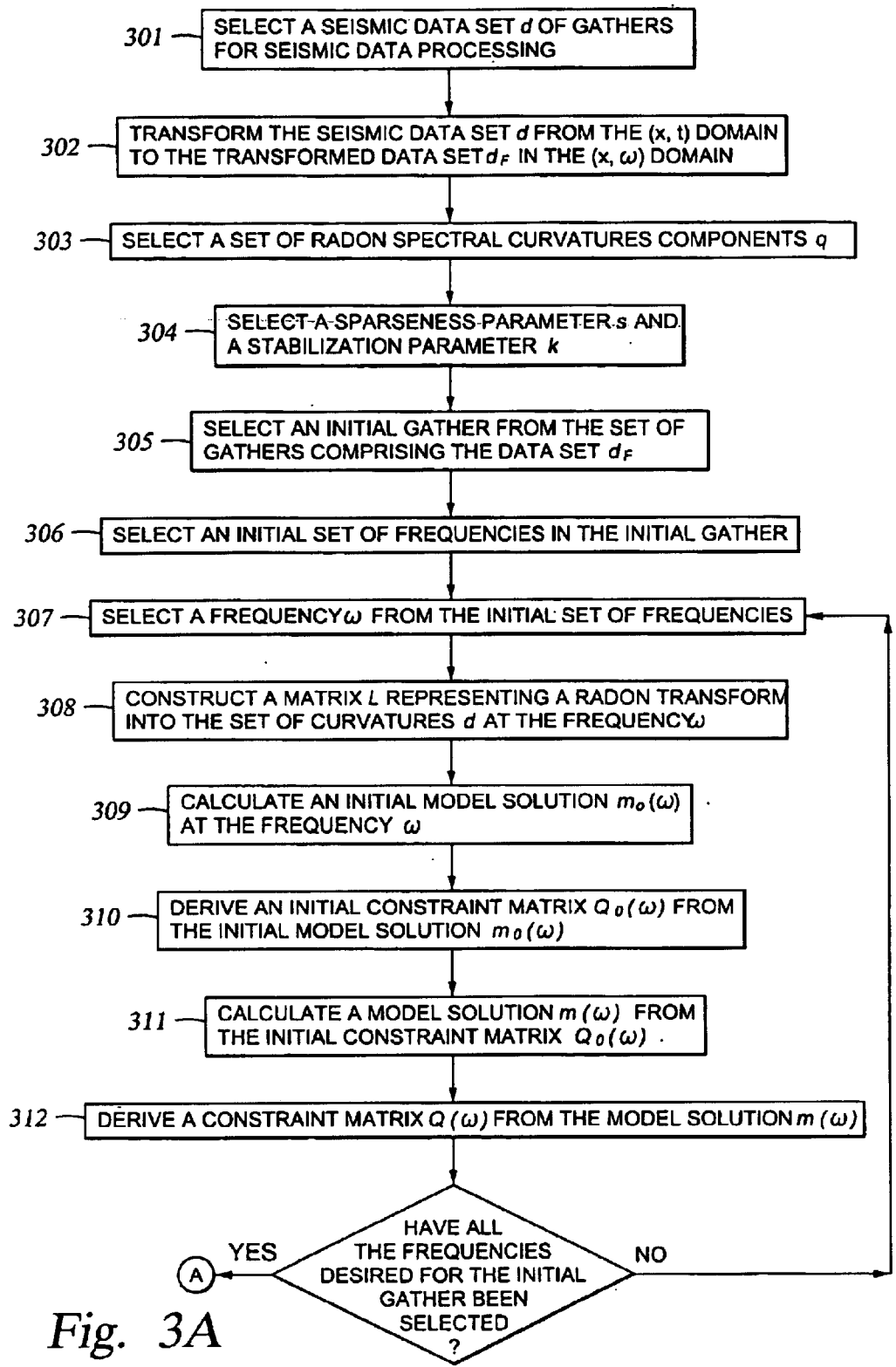
FIGS. 3a–3c show a flowchart illustrating the processing steps of an embodiment of the method of the invention for processing seismic data.
Figure 3B:
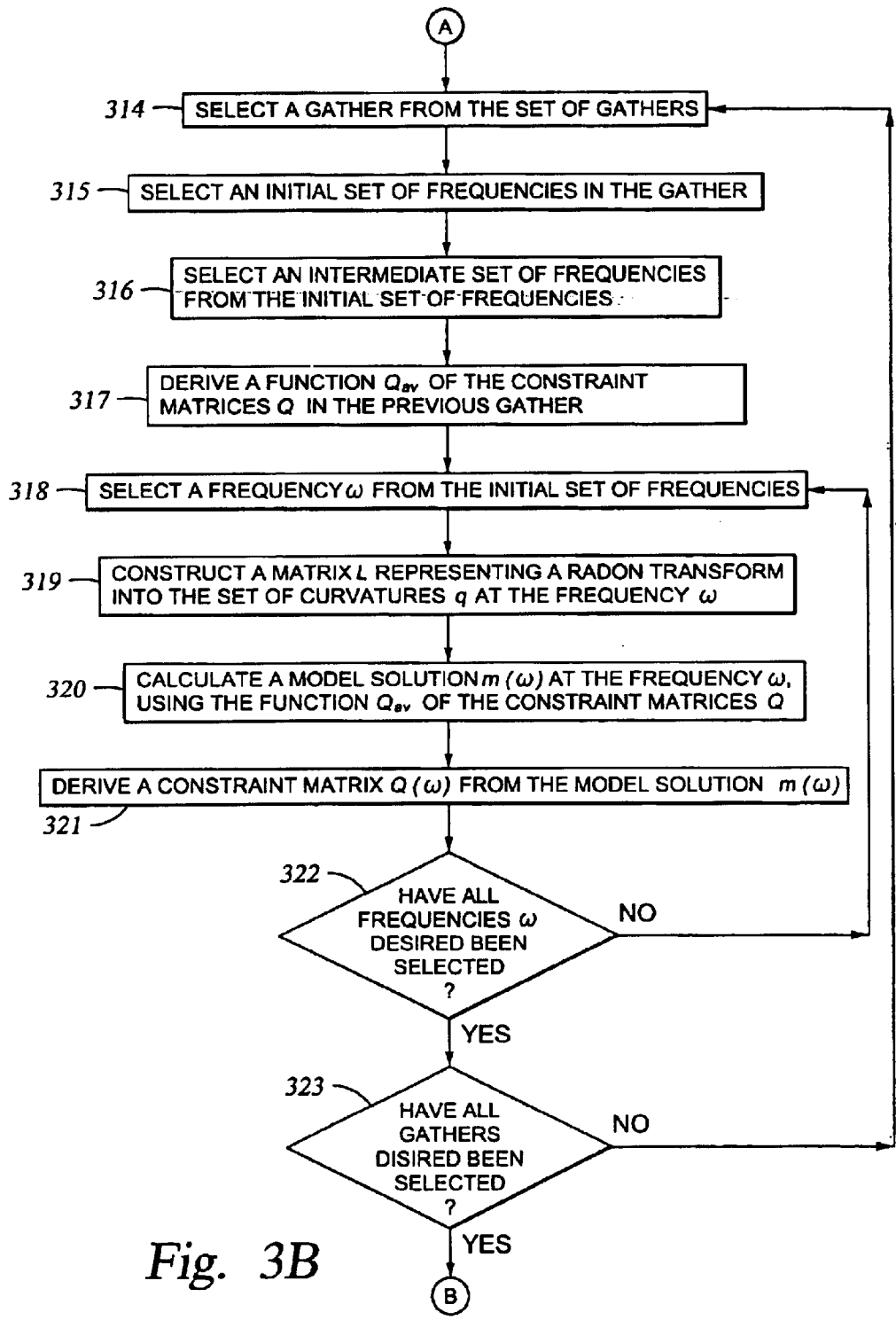
Figure 3C:
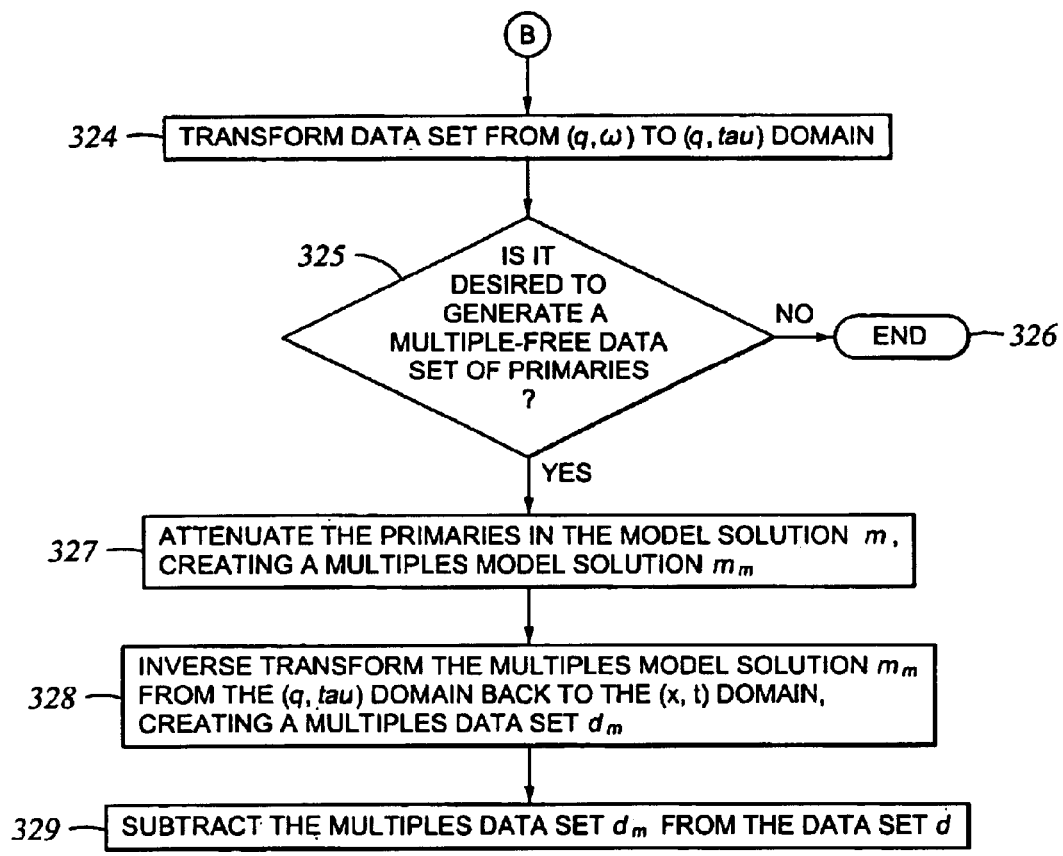

The invention uses a non-iterative, frequency independent approach to deriving the constraint matrix Q. The method of the invention derives the constraint matrix Q, using Equation (22), from the components $m_i$ of the solution m from a first gather, rather than at a lower frequency, as in the method of the Compagnie Generale de Geophysique, described in FIG. 2. Then the method of the invention uses the derived constraint matrix Q for each frequency in a second gather. Thus, the constraint matrix Q is frequency independent, that is, is not recalculated for each frequency within each gather. The relation between the first and second gathers is not restricted in the invention. In different embodiments, the second gather may be the same as or positioned adjacent to the first gather or any or all other gathers in the data set. FIGS. 3a–3c show a flowchart illustrating the processing steps of an embodiment of the method of the invention for processing seismic data.

At step 301 in FIG. 3a, a seismic data set d is selected for seismic data processing. The seismic data set selected is a set of gathers of seismic traces. A set of gathers, rather than just a single gather, is used since the constraint matrix Q will be derived from the previous gather.

At step 302, the seismic data set d selected in step 301 is transformed from the (x, t) domain to the (x, ω) domain. This transformation generates a transformed data set $d_F$. The transformation defines a set of frequencies ω in $d_F$. The transformation is typically done by a Fourier transform, preferably by a fast Fourier transform.

At step 303, a set of Radon spectral components are selected for a Radon transform of the transformed data set $d_F$ generated in step 302. The spectral components are a set of curvatures q.

At step 304, a sparseness parameter s and a stabilization parameter k are selected for the Radon transform. The sparseness parameter s is selected as a fraction, where s>0. The preferred value is in the range $0.05 \leq s \leq 0.5$ and depends upon the particular data set d.

If the fraction s is large, that is, $s \geq 0.5$, then Equation (18) reduces to Q≠kI. This case is effectively equivalent to the conventional diagonally stabilized least squares Radon transform approach of Equation (3). Here k is substantially equivalent to the pre-whitening factor or diagonal stabilization constant k in Equation (3).

If the fraction s is small, then the spectral components $m_i$ with higher energy will have reduced diagonal constraint factors $Q_{ii}$. The minimum constraint factor $Q_{ii}$ occurs for the $m_i$ with the maximum energy $\max_j(|m_j|^2)$, and there $Q_{ii} \approx s \cdot k$. If this fraction s is chosen very small, then the results will be noisy.

If the energy in the Radon domain is equal to s $\max_j (|m_j|^2)$, then $Q_{ii}=k/2$. This means that for curvature values where there are no primaries or multiples, the stabilization is half of the stabilization used for the conventional diagonally stabilized least squares Radon transform approach of Equation (3). Therefore, the pre-whitening factor or diagonal stabilization constant k can be chosen somewhat higher for the high-resolution Radon transform of Equation (17), in this case.

At step 305, an initial gather is selected from the set of gathers in the transformed data set $d_F$ in step 302. The initial gather must be treated slightly differently than the remaining gathers. For the remaining gathers, the constraint matrix Q used to derive a model solution m will be derived from the model solutions m obtained from the previously selected gather. There is no previously selected gather for the initial gather. Thus, an initial model solution must be derived separately.

Although this use of the previously selected gather is the preferred embodiment, the invention is not restricted to this. The constraint matrix Q derived in one gather could be used to derive the model solution m in any other gather or gathers, including the same gather used to derive the constraint matrix Q. The invention will be described in this embodiment for illustrative purposes only.

At step 306, an initial set of frequencies o) from the transformed seismic data set $d_F$ from step 302 is selected in the initial gather selected in step 305. Preferably, this initial frequency set is chosen to cover the frequencies present in the gather. However, the invention is not restricted to this, and any appropriate set of frequencies may be chosen. In an alternative embodiment, this selection of frequencies is made only once, to cover all the gathers in the seismic data set from step 301.

At step 307, a frequency c is selected from the initial set of frequencies selected in step 306. For computational ease, the frequencies are typically chosen in sequential order, starting at the lowest frequency. However, the invention is not restricted to this, and any appropriate sequence of frequencies may be chosen.

At step 308, a matrix L representing a Radon transform into the set of curvatures q selected in step 303 is constructed. The matrix L satisfies Equation (1) for a Radon model solution m as defined in that discussion. Thus, the solution m is defined as a function of the curvatures $q_i$ for each frequency $\omega_i$. At each frequency $\omega_i$, the solution m(cod will be solved as a linear problem. In the method of the invention, the type of Radon transform used includes, but is not limited to, linear and parabolic Radon transforms.

At step 309, an initial model solution $m_0(\omega)$ is calculated at the frequency co selected in step 307. The initial solution $m_0(\omega)$ is preferably calculated using the following equation, $$m_0(\omega) = L^H d(\omega). \tag{23}$$

The calculation in Equation (23) transforms the transformed data set $d_F$ from the Fourier domain (x, $\omega$) to a another transformed data set $d_R$ in the Radon domain (q, $\omega$).

At step 310, an initial constraint matrix $Q_0(\omega)$ is derived from the initial model solution $m_0(\omega)$ calculated in step 309. The matrix $Q_0(\omega)$ is preferably calculated using the following version of Equation (22), $$Q_0(\omega)_{ii} = k \frac{1}{1 + \frac{|m_0(\omega)_i|^2}{s \max_j (|m_0(\omega)_j|^2)}}. \tag{24}$$

Here $Q_0(\omega)_{ii}$, for i=1, ..., N, are the diagonal elements of the diagonal matrix $Q_0(\omega)$ and $m_0(\omega)_i$, for i=1, ..., N, are the spectral components of the vector $m_0(\omega)$.

At step 311, a model solution m($\omega$) is calculated from the initial constraint matrix $Q_0(\omega)$ derived in step 310. The solution m($\omega$) is preferably calculated using the following version of Equation (18), $$m(\omega) = (L^H L + Q_0(\omega))^{-1} L^H d(\omega). \tag{25}$$

The calculation in Equation (25) transforms the transformed data set $d_F$ from the Fourier domain (x, $\omega$) to a another transformed data set $d_R$ in the Radon domain (q, a).

At step 312, a constraint matrix Q($\omega$) is derived from the model solution m($\omega$) calculated in step 311. The matrix Q($\omega$) is preferably calculated using the following version of Equation (22), $$Q(\omega)_{ii} = k \frac{1}{1 + \frac{|m(\omega)_i|^2}{s \max_j (|m(\omega)_j|^2)}}, \tag{26}$$

Here $Q(\omega)_{ii}$, for i=1, ..., N, are the diagonal elements of the diagonal matrix Q($\omega$) and m($\omega$)$_i$, for i=1, ..., N, are the spectral components $q_i$ of the vector m($\omega$).

At step 313, it is determined if all the frequencies desired for the initial gather have been selected. If the answer is no, then the process returns to step 307 to select another frequency. If the answer is yes, then the process continues to step 314 in FIG. 3b.

At step 314 in FIG. 3b, a gather is selected from the set of gathers selected in step 301. The gathers are selected in sequence in proximity order so that any two gathers in the sequence are adjacent in location to each other.

At step 315, an initial set of frequencies in the seismic data set is selected in the gather selected in step 314. Preferably, this initial frequency set is chosen to cover the frequencies present in the gather. However, the invention is not restricted to this, and any appropriate set of frequencies may be chosen.

At step 316, an intermediate set of frequencies is selected from the initial set of frequencies selected in step 315. This intermediate frequency set is typically chosen to cover a range of intermediate frequencies. However, the invention is not restricted to this, and any appropriate intermediate set of frequencies may be chosen. This intermediate frequency set should be chosen where the data have a good signal-to-noise ratio and are not aliased. Preferably, the intermediate frequency set is chosen at frequencies that show good resolution in the Radon transform curvature parameters. Thus, the intermediate frequency set is not chosen at the lower frequencies present in the seismic data set. The intermediate frequency range must be chosen between 0 and the Nyquist frequency. The preferred intermediate frequency set is the range from 30 to 40 Hertz.

At step 317, a function $Q_{av}$ of the constraint matrices Q derived in the previous gather is calculated at the frequencies c in the intermediate frequency set selected in step 316. This function is preferably an average, but the invention is not restricted to this. Let the intermediate frequency set be given by $\omega_{l+k}$ for k=0, 1, K−1, that is, $\omega_l$ to $\omega_{l+K-1}$. Then the average is preferably calculated by the equation, $$Q_{av} = \frac{1}{K} \sum_{k=0}^{K-1} Q(\omega_{l+k}). \tag{27}$$

The importance of step 314 is that $Q_{av}$ is frequency independent in each gather.

At step 318, a frequency $\omega$ is selected from the initial set of frequencies selected in step 315. For computational ease, the frequencies are typically chosen in sequential order, starting at the lowest frequency. However, the invention is not restricted to this, and any appropriate sequence of frequencies may be chosen.

At step 319, a matrix L representing a Radon transform into the set of curvatures q selected in step 303 is constructed. The matrix L satisfies Equation (1) for a Radon model solution m as defined in that discussion. Thus, the solution m is defined as a function of the curvatures $q_i$ for each frequency $\omega_i$. At each frequency $\omega_i$, the solution m($\omega_i$) will be solved as a linear problem.

At step 320, a model solution m($\omega$) is calculated at the frequency $\omega$ selected in step 318, using the function $Q_{av}$ of the constraint matrices Q calculated in step 317 and the Radon transform matrix L constructed in step 319 The solution m($\omega$) is preferably calculated using the following version of Equation (18), $$m(\omega) = (L^H L + Q_{av})^{-1} L^H d(\omega). \tag{28}$$

The calculation in Equation (28) transforms the transformed data set $d_F$ from the Fourier domain (x, $\omega$) to a another transformed data set $d_R$ in the Radon domain (q, $\omega$).

At step 321, a constraint matrix Q($\omega$) is derived from the model solution m($\omega$) calculated in step 320. The matrix Q($\omega$) is preferably calculated using the following version of Equation (22), $$Q(\omega)_{ii} = k \frac{1}{1 + \frac{|m(\omega)_i|^2}{s \max_j (|m(\omega)_j|^2)}}. \tag{29}$$

Here $Q(\omega)_{ii}$, for i=1, ..., N, are the diagonal elements of the diagonal matrix Q($\omega$) and m($\omega$)$_i$, for i=1, ..., N, are the spectral curvature components of the vector m($\omega$).

At step 322, it is determined if all the frequencies desired have been selected. If the answer is no, then the process returns to step 318 to select another frequency. If the answer is yes, then the process continues to step 323.

At step 323, it is determined if all the gathers desired have been selected. If the answer is no, then the process returns to step 314 to select another gather. If the answer is yes, then the process continues to step 324 in FIG. 3c.

At step 324 in FIG. 3c, the transformed data set $d_R$ is transformed from the (q, ω) domain to the (q, tau) domain. Here tau is the zero offset intercept time. This transformation generates a inverse-transformed data set $d_R$. The transformation is preferably done by an inverse fast Fourier transform.

At step 325, it is determined if it is desirable to use the calculated model solution to generate a substantially multiple-free data set of primaries. If the answer is no, then the process ends at step 326. If the answer is yes, then the process continues to step 327.

At step 327, the primaries are attenuated in the model solution m, creating a multiples model solution $m_m$. This attenuation may be done by any of the means well-know in the art of seismic processing with a Radon transform.

At step 328, the multiples model solution $m_m$ is inverse transformed from the (q, tau) domain to the spatial domain. This inverse transformation generates a multiples data set $d_m$. This multiples data set $d_m$ contains substantially all the multiples in the original seismic data set d. The step of inverse transforming the multiples model solution $m_m$ to the multiples data set $d_m$ preferably uses the following equation, $$d_m = L m_m. \quad (30)$$

The matrix to be inverted, $(L^H L + kI)$, has Toeplitz structure and can be inverted using the Levinson recursion scheme, since the stabilization matrix kI is constant.

At step 329, the multiples data set $d_m$ is subtracted from the data set d. This subtraction generates a primaries data set $d_p$. This primaries data set $d_p$ contains substantially all of the primaries and substantially none of the multiples in the original seismic data set d.

Figure 4A:
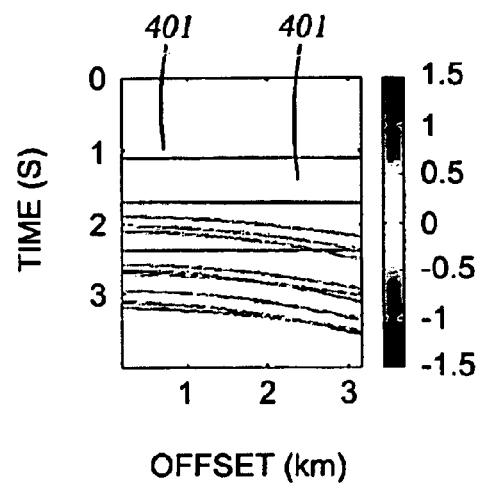
FIG. 4a shows a synthetic data set used in testing transforms.
Figure 4B:
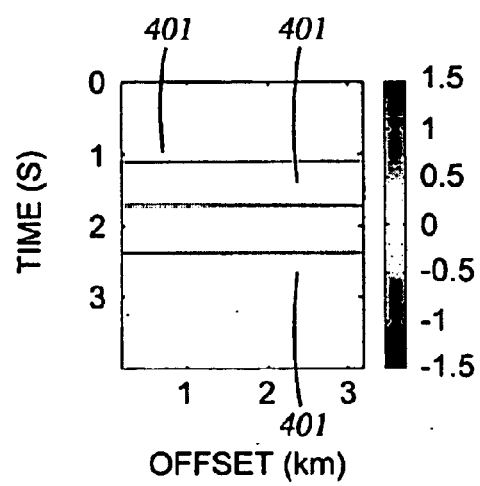
FIG. 4b shows the same data set as FIG. 4a, but with the primaries only.
Figure 4C:
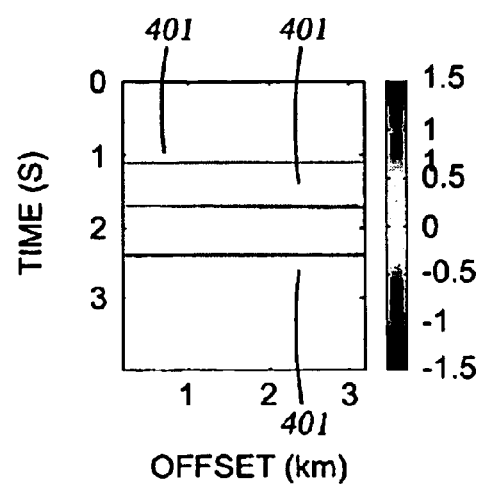
FIG. 4c shows the result after multiple attenuation using a least squares transform.

FIG. 4a shows a simple synthetic data set that was used to test the high-resolution Radon transform. The events are perfectly parabolic, but the curvatures are not exactly equal to the curvature parameters that are used for the Radon transform. The primaries 401 also have small curvature. Moreover, most primaries and multiples have varying amplitudes with offset. FIG. 4b shows the same data set, but with the primaries 401 only displayed. FIG. 4c shows the result of attenuation of multiples using the standard least squares transform, leaving substantially the primaries 401.

Figure 5A:
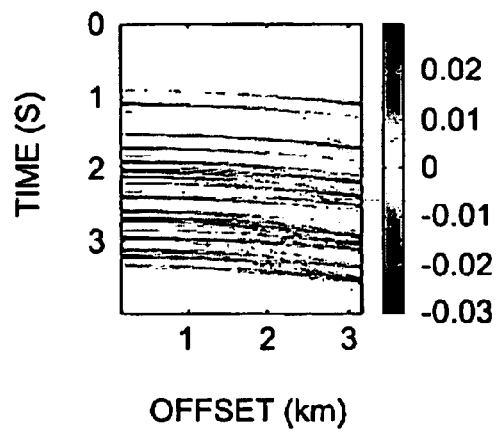
FIG. 5a shows the difference between the gather after multiple attenuation from FIG. 4b and the modeled multiple free gather in FIG. 4c, for the least squares transform.
Figure 5B:
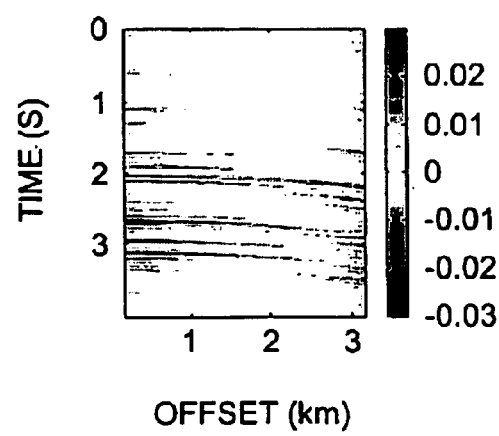
FIG. 5b shows the difference between the gather after multiple attenuation from FIG. 4b and the modeled multiple free gather in FIG. 4c, for the high-resolution Radon transform.
Figure 6A:
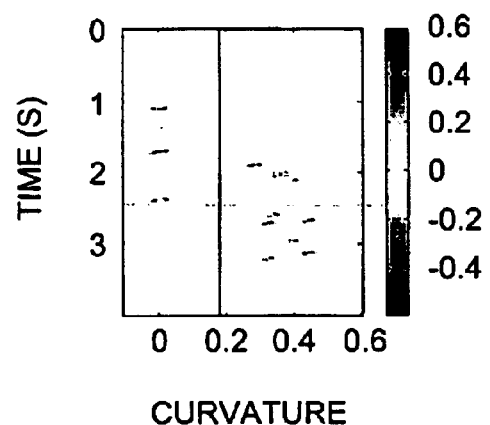
Figure 6B:
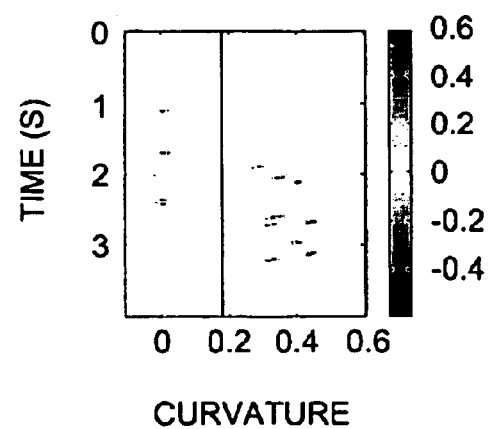
FIG. 6b shows the corresponding Radon spectra for the FIG. 5b.

For a comparison with the high-resolution Radon transform, the difference between the gather after multiple attenuation in FIG. 4b and the modeled multiple free gather in FIG. 4c will be examined. FIG. 5a shows this difference for the least squares transform. FIG. 5b shows the difference for the high-resolution Radon transform. FIGS. 5a and 5b show clipped data. Note the gray-scale bars next to the plots. Use of the high-resolution Radon transform in FIG. 5b shows a better attenuation of multiples than use of the least squares transform in FIG. 5a shows. However, FIG. 5b also shows some smearing (or ringing) of energy in the time direction between 0 and 0.8 sec. The corresponding Radon spectra are shown in FIGS. 6a and 6b, respectively.

The smearing of energy in the time direction, as shown in FIG. 5b, can effectively be suppressed by using a frequency independent constraint matrix Q, or its equivalent, in a high-resolution Radon transform, as in the method of the invention.

Figure 7A:
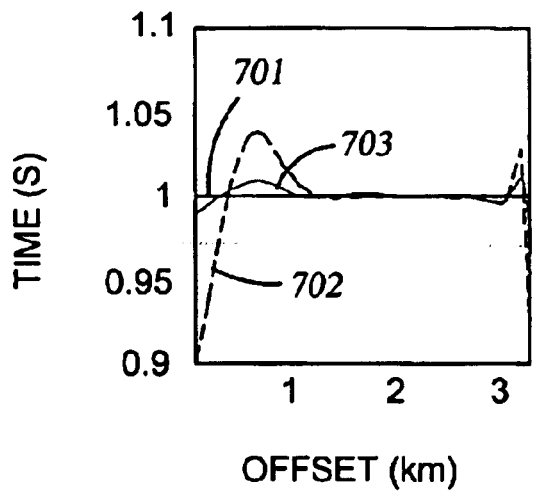
FIG. 7a shows a plot illustrating amplitude preservation for a primary with constant amplitude.
Figure 7B:
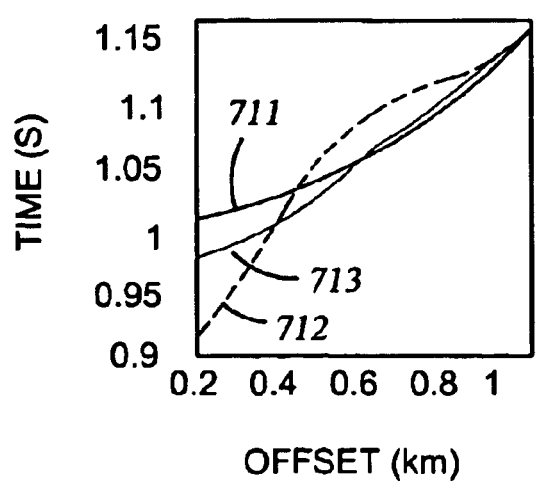
FIG. 7b shows a plot illustrating amplitude preservation for a primary with AVO variation.

FIG. 7a shows an illustration of amplitude preservation for a constant amplitude primary. The solid line 701 shows the ideal modeled AVO variation, the dashed line 702 51 shows the amplitude after least squares Radon multiple attenuation, and the dotted line 703 shows the amplitude after high-resolution Radon multiple attenuation. FIG. 7b shows a similar plot for a primary with AVO variation. Again, the solid line 711 shows the ideal modeled AVO variation, the dashed line 712 shows the amplitude after attenuation of multiples by applying a least squares Radon transform, and the dotted line 713 shows the amplitude after attenuation of multiples by applying a high-resolution Radon transform. Both FIGS. 7a and 7b indicate that better amplitude preservation is obtained using the method of the invention for attenuation of multiples by applying a high-resolution Radon transform.

Figure 8A:
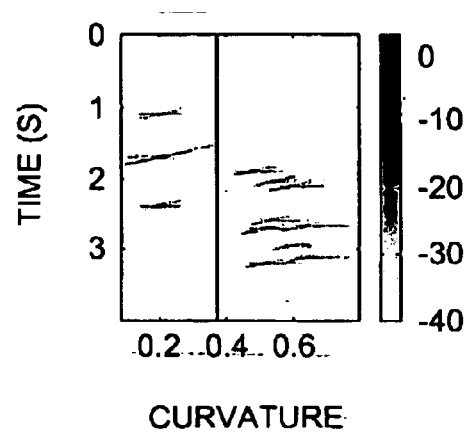
FIG. 8a shows the absolute Radon spectra as a result of using the standard least squares transform.
Figure 8B:
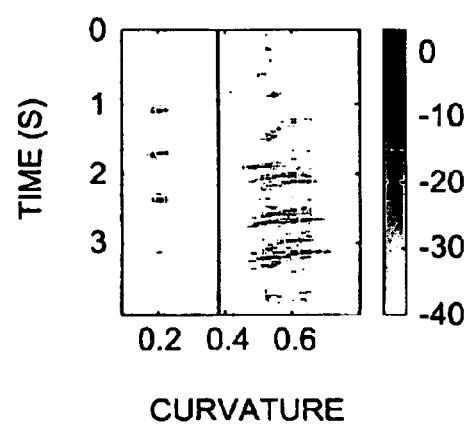
FIG. 8b shows the absolute Radon spectra as a result of using the high-resolution Radon transform.
Figure 8C:
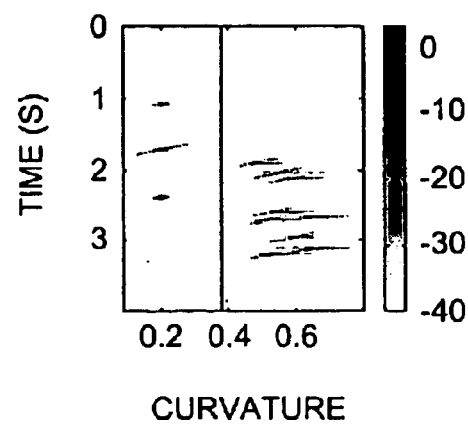
FIG. 8c shows the absolute Radon spectra as a result of using the high-resolution Radon transform with a frequency independent prior.

FIGS. 8a to 8c show the absolute Radon spectra for the different methods. A logarithmic scale is used to show the artifacts. FIG. 8a shows the result of using the standard least squares transform. FIG. 8b shows the result of using the high-resolution Radon transform. FIG. 8c shows the result of using the high-resolution Radon transform with a frequency independent prior. The smearing of energy in the time dimension present in FIG. 8b is not visible in FIG. 8c. In practice, the frequency constraint matrix Q can be derived in a cost efficient manor from a previous adjacent common midpoint gather.

On the examples shown, using synthetic data sets, the high-resolution Radon transform method of the invention shows significantly reduced edge effects and much better reconstruction in large gaps than the standard least squares transforms. The smearing in the time direction observed with the high-resolution transforms can be effectively suppressed by using a frequency independent constraint matrix Q, or its equivalent. The good amplitude preservation means that the high-resolution transforms are well suited for multiple attenuation before AVO and for regularization of time-lapse data.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

What is claimed is:

1. A method for processing a seismic data set, comprising:
   selecting a set of gathers in the seismic data set;
   calculating a frequency independent constraint matrix for a high-resolution Radon transform in a first gather; and
   calculating a model solution in at least one second gather using the constraint-matrix in a high-resolution Radon transform.

2. The method of claim 1, wherein the first and second gathers are the same gather.

3. The method of claim 1, wherein the first and second gathers are different gathers.

4. The method of claim 3, wherein the first and second gathers are adjacent gathers.

5. The method of claim 1, wherein the step of selecting a set of gathers in the seismic data set comprises:
   transforming the seismic data set from the (x, t) domain to the (x, ω) domain;
   selecting an initial gather from the transformed gathers; and
   performing the following steps for the selected initial gather;

selecting an initial plurality of frequencies in the selected initial gather;

selecting a frequency $\omega$ from the selected initial plurality of frequencies; and performing the following steps for the selected initial gather;

constructing a matrix L representing a Radon transform at the frequency $\omega$;

calculating an initial model solution $m_0(\omega)$ at the selected frequency $\omega$, using the matrix L in a high-resolution Radon transform;

deriving an initial constraint matrix $Q_0(\omega)$ from the calculated initial model solution $m_0(\omega)$;

calculating a model solution $m(\omega)$ from the derived initial constraint matrix $Q_0(\omega)$, using the matrix L in a high-resolution Radon transform; and deriving a constraint matrix $Q(\omega)$ from the calculated model solution $m(\omega)$.

6. The method of claim 5, wherein the step of calculating a constraint matrix comprises:

selecting an initial plurality of frequencies in the gather;

selecting an intermediate plurality of frequencies from the selected initial plurality of frequencies; and calculating a function $Q_{av}$ of the constraint matrices Q derived in the previous gather at the selected intermediate plurality of frequencies $\omega$.

7. The method of claim 6, wherein the step of calculating a model solution comprises:

selecting a frequency $\omega$ from the selected initial plurality of frequencies; and performing the following steps for the selected frequency $\omega$ in the gather constructing a matrix L representing a Radon transform at the frequency $\omega$;

calculating a model solution $m(\omega)$ at the selected frequency $\omega$, using the calculated function $Q_{av}$ and the matrix L in a high-resolution Radon transform; and deriving a constraint matrix $Q(\omega)$ from the calculated model solution $m(\omega)$.

8. The method of claim 1, wherein the step of selecting a set of gathers in the seismic data set comprises:

transforming the seismic data set from the (x, t) domain to the (x, $\omega$) domain;

selecting a plurality of Radon spectral curvatures q;

selecting a sparseness parameters and a stabilization parameter k, selecting an initial gather from the transformed gathers; and performing the following steps for the selected initial gather;

selecting an initial plurality of frequencies in the selected initial gather;

selecting a frequency $\omega$ from the selected initial plurality of frequencies; and performing the following steps for the selected initial gather;

constructing a matrix L representing a Radon transform into the set of curvatures q at the frequency $\omega$;

calculating an initial model solution $m_0(\omega)$ at the selected frequency $\omega$, using a high-resolution Radon transform L;

deriving an initial constraint matrix $Q_0(\omega)$ from the calculated initial model solution $m_0(\omega)$, using the sparseness parameters and the stabilization parameter k, calculating a model solution $m(\omega)$ from the derived initial constraint matrix $Q_0(\omega)$, using the high-resolution Radon transform L; and deriving a constraint matrix $Q(\omega)$ from the calculated model solution $m(\omega)$, using the sparseness parameter s and the stabilization parameter k.

9. The method of claim 8, wherein the step of calculating a constraint matrix comprises:

selecting an initial plurality of frequencies in the gather;

selecting an intermediate plurality of frequencies from the selected initial plurality of frequencies; and calculating a function $Q_{av}$ of the constraint matrices Q derived in the previous gather at the selected intermediate plurality of frequencies $\omega$.

10. The method of claim 9, wherein the step of calculating a model solution comprises:

selecting a frequency $\omega$ from the selected initial plurality of frequencies; and performing the following steps for the selected frequency $\omega$ in the gather constructing a matrix L representing a Radon transform into the set of curvatures q at the frequency $\omega$;

calculating a model solution $m(\omega)$ at the selected frequency $\omega$, using the calculated function $Q_{av}$ and the high-resolution Radon transform L; and deriving a constraint matrix $Q(\omega)$ from the calculated model solution $m(\omega)$, using the sparseness parameter s and the stabilization parameter k.

11. A method for processing a seismic data set of gathers, comprising:

transforming the seismic data set from the (x, t) domain to the (x, $\omega$) domain;

selecting an initial gather from the transformed gathers;

performing the following steps for the selected initial gather; and selecting an initial plurality of frequencies in the selected initial gather;

selecting a frequency $\omega$ from the selected initial plurality of frequencies; and performing the following steps for the selected initial gather;

constructing a matrix L representing a Radon transform at the frequency $\omega$;

calculating an initial model solution $m_0(\omega)$ at the selected frequency $\omega$, using the matrix L in a high-resolution Radon transform;

deriving an initial constraint matrix $Q_0(\omega)$ from the calculated initial model solution $m_0(\omega)$;

calculating a model solution $m(\omega)$ from the derived initial constraint matrix $Q_0(\omega)$, using the matrix L in a high-resolution Radon transform; and deriving a constraint matrix $Q(\omega)$ from the calculated model solution $m(\omega)$, performing the following steps for the transformed data set of gathers;

selecting a gather from the transformed data set of gathers;

selecting an initial plurality of frequencies in the selected gather;

selecting an intermediate plurality of frequencies from the selected initial plurality of frequencies;

calculating a function $Q_{av}$ of the constraint matrices Q derived in the previous gather at the selected intermediate plurality of frequencies $\omega$;

selecting a frequency $\omega$ from the selected initial plurality of frequencies; and performing the following steps for the selected frequency ω in the selected gather
constructing a matrix L representing a Radon transform at the frequency ω;
calculating a model solution m(ω) at the selected frequency ω, using the calculated function $Q_{av}$ and the matrix L in a high-resolution Radon transform; and
deriving a constraint matrix Q(ω) from the calculated model solution m(ω).

12. A method for processing a seismic data set of gathers, comprising:
transforming the seismic data set from the (x, t) domain to the (x, ω) domain;
selecting a plurality of Radon spectral curvatures q;
selecting a sparseness parameter s and a stabilization parameter k;
selecting an initial gather from the transformed gathers;
performing the following steps for the selected initial gather; and
selecting an initial plurality of frequencies in the selected initial gather;
selecting a frequency ω from the selected initial plurality of frequencies; and
performing the following steps for the selected initial gather;
constructing a matrix L representing a Radon transform into the set of curvatures q at the frequency ω;
calculating an initial model solution $m_0(\omega)$ at the selected frequency ω, using the matrix L in a high-resolution Radon transform;
deriving an initial constraint matrix $Q_0(\omega)$ from the calculated initial model solution $m_0(\omega)$, using the sparseness parameter s and the stabilization parameter k;
calculating a model solution m(ω) from the derived initial constraint matrix $Q_0(\omega)$, using the matrix L in a high-resolution Radon transform; and
deriving a constraint matrix Q(ω) from the calculated model solution m(ω), using the sparseness parameter s and the stabilization parameter k;
performing the following steps for the transformed data set of gathers;
selecting a gather from the transformed data set of gathers;
selecting an initial plurality of frequencies in the selected gather;
selecting an intermediate plurality of frequencies from the selected initial plurality of frequencies;
calculating a function $Q_{av}$ of the constraint matrices Q derived in the previous gather at the selected intermediate plurality of frequencies ω;
selecting a frequency ω from the selected initial plurality of frequencies; and
performing the following steps for the selected frequency ω in the selected gather
constructing a matrix L representing a Radon transform into the set of
curvatures q at the frequency ω;
calculating a model solution m(ω) at the selected frequency ω, using the calculated function $Q_{av}$ and the matrix L in a high-resolution Radon transform; and
deriving a constraint matrix Q(ω) from the calculated model solution m(ω), using the sparseness parameters and the stabilization parameter k.

13. The method of claim 12, wherein the step of calculating a model solution m(ω) from the initial constraint matrix $Q_0(\omega)$ uses the equation:

$$m(\omega) = (L^H L + Q_0(\omega))^{-1} L^H d(\omega).$$

14. The method of claim 12, wherein the step of calculating a model solution m(ω) at the frequency ω, using the calculated function $Q_{av}$ uses the following equation:
$m(\omega) = (L^H L + Q_{av})^{-1} L^H d(\omega).$ 15. The method of claim 12, where the step of calculating a function $Q_{av}$ of the constraint matrices Q derived in the previous gather, at the intermediate sequence of frequencies, uses the equation:

$$Q_{av} = \frac{1}{K} \sum_{k=0}^{K-1} Q(\omega_{l+k}),$$

where $\omega_{l+k}$ for k=0, 1, K−1, are the intermediate sequence of frequencies.

16. The method of claim 12, further comprising:
attenuating the primaries in the model solution m, generating the multiples model solution $m_m$;
inverse transforming the multiples model solution $m_m$, generating the multiples data set $d_m$; and
subtracting the multiples data set $d_m$ from the seismic data set d.

17. The method of claim 12, wherein the step of inverse transforming the multiples model solution $m_m$ uses the equation:

$$d_m = L m_m.$$

18. The method of claim 12, wherein the step of calculating an initial model solution $m_0(\omega)$ at the frequency a uses the equation:

$$m_0(\omega) = L^H d(\omega).$$

19. The method of claim 12, wherein the step of deriving an initial constraint matrix Q(ω) from the initial model solution m(ω) uses the equation:

$$Q_0(\omega)_{ii} = k \frac{1}{1 + \frac{|m_0(\omega)_i|^2}{s \max_j (|m_0(\omega)_j|^2)}},$$

where $Q_0(\omega)_{ii}$ for i=1, ..., N, are the diagonal elements of the initial constraint matrix $Q_0(\omega)$, k is the stabilization constant, s is the sparseness constant, and $m_0(\omega)_i$ for i=1, N, are the elements of the initial model solution $m_0(\omega)$.

20. The method of claim 12, wherein the step of deriving a constraint matrix Q(ω) from the model solution m(ω) uses the equation:

$$Q(\omega)_{ii} = k \frac{1}{1 + \frac{|m(\omega)_i|^2}{s \max_j (|m(\omega)_j|^2)}},$$

where $Q(\omega)_{ii}$ for i=1, ..., N, are the diagonal elements of the constraint matrix Q(ω), k is the stabilization constant, s is the sparseness constant, and $m(\omega)_i$ for i=1, ..., N, are the elements of the model solution m(ω).

* * * * *